Jan. 2, 1973   P. A. IMMETHUN   3,708,385
SANDWICH PANEL CONSTRUCTION
Filed June 21, 1971   3 Sheets-Sheet 1

3,708,385
SANDWICH PANEL CONSTRUCTION
Peter A. Immethun, Ferndale, Mich., assignor to Ethyl
Corporation, New York, N.Y.
Filed June 21, 1971, Ser. No. 155,101
Int. Cl. B32b 3/02, 3/26, 15/00
U.S. Cl. 161—69                            20 Claims

ABSTRACT OF THE DISCLOSURE

A sandwich panel construction comprising two independent outer layers attached to opposite sides of a foamed metal core, said core having reinforcing elements therein. Compared to sandwich panel construction having no reinforcing elements, the present construction has substantially improved resistance to deformation.

BACKGROUND OF THE INVENTION

A sandwich panel construction wherein outer layers are bonded to a foamed metal core is described in a copending application, Ser. No. 30,469, filed Apr. 21, 1970. This sandwich construction provides panels which are (1) relatively light weight, (2) warp resistant, (3) deterioration resistant and which have good strength and deflection characteristics.

The load-carrying capacity and general strength of this construction are substantially improved by providing reinforcing elements within the foamed metal core. This improved sandwich panel construction extends its usefulness in heavier duty applications.

SUMMARY OF THE INVENTION

Improved sandwich panel construction comprising two outer layers attached to opposite sides of a foamed metal core having reinforcing elements provided therein; method of fabricating such a panel construction.

BRIEF DESCRIPTION OF THE DRAWINGS

FIG. 1 illustrates a full view of a reinforced panel, in partial section. The foam core 1 has metal reinforcing elements 2 (with full position shown in phantom), and is bonded to metal outer layers 3 and 3'.

FIG. 2 illustrates a section through FIG. 1 showing the outer layers 3 and 3', attached to the foamed metal core 1 with an adhesive 5, having perpendicular metal reinforcing elements 2 (bonded to said foamed metal with adhesive 4).

FIG. 3 illustrates reinforced panel construction with one outer layer being metal sheet 3 and the other outer layer being thermoset organic polymer 6, over a layer of woven Fiberglas 7, having a passageway 1a therein.

FIG. 5 illustrates reinforced panel construction having one wood outer layer 8 and one elastomer outer layer 9.

FIGS. 6 and 7 illustrate reinforced panel construction wherein the reinforcing elements 2 are positioned other than perpendicular to the outer layers.

FIGS. 8 and 9 illustrate reinforced panel construction wherein the reinforcing elements are wood 10 and thermoset organic polymer 11, respectively.

FIG. 10 is a flow diagram schematically illustrating a method of manufacturing the present reinforced panel construction.

DESCRIPTION OF THE PREFERRED EMBODIMENTS

Figure 1:
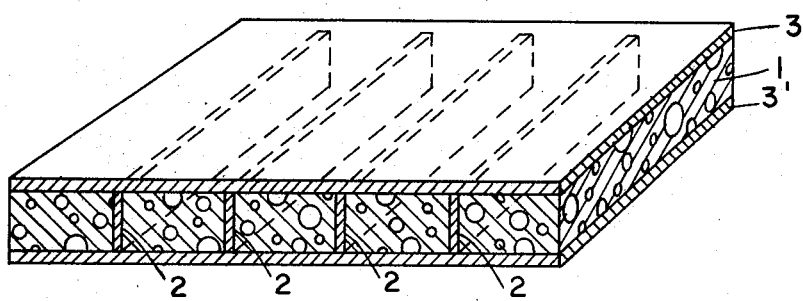
FIGS. 1–9 (a) are sections or partial sections of the sandwich construction of the present invention, and (b) are not to scale.
Figure 2:
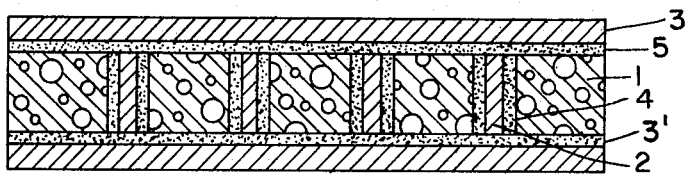

An embodiment of this invention is sandwich panel construction where two layers of material which is solid at ordinary room temperature are attached to a foamed meal core which has reinforcing elements in and attached thereto. The layers attached to said core may be independent sheets or may be applied as fluid coatings which will solidify after being applied to the foamed metal core. A preferred embodiment uses of foamed aluminum core having metal reinforcing elements therein. The density of the foamed aluminum portion of the core may range from about 5 to about 35 p.c.f. (pounds per cubic foot), preferably from about 5 to 30 p.c.f.; and more preferably from 8 to 27 p.c.f.

The outer layers which are attached to the foamed metal core having reinforcing elements therein, may be of any suitable material which is preferably solid at ordinary room temperature. Suitable materials are exemplified by wood, metal, thermoplastic organic polymers, thermoset organic polymers, both reinforced and non-reinforced, glass, elastomers, and the like.

The outer layer or layers may be applied to the core either as independent sheets of suitable material or as a liquid phase which later solidifies to form a material which is solid at room temperature.

When sheet material is used, the outer layers may be attached by mechanical means such as for example rivets, screws, and other similar fasteners; pseudo mechanical fastening means may also be used for example soldering, welding or brazing sheet material to the core.

A preferred method of attaching sheet materials to the reinforced core is by use of a suitable adhesive. Adhesive systems which are available in the art may be used. Ordinarily, the adhesive systems are thermosetting organic polymer resing and elastomers. By thermosetting is meant that the fluid polymer resin and/or elastomer can be chemically or thermally cured or hardened forming a solid, substantially infusible material. Many chemical classes of such adhesives are available, for example, polyester resins, epoxy resins, polyurethane resins and elastomers, ureaformaldehyde resins, acrylonitrile resins, phenolic resins, polysulfide systems, ethylene/propylene/diene terpolymers and the like. Any such adhesive system which will effect a good bond between the outer layers and the foamed metal core can be used. The epoxy, the polyester, the polyurethane systems and systems which utilize mixtures of these resins are preferred.

Many different adhesives and cements may be employed to bond the sheet material to foamed aluminum, particularly in the case of the composite article. Typical of the synthetic organic adhesives that may be used in accordance with the present invention are the thermosetting and thermoplastic adhesives. Exemplary of the thermosetting adhesives are phenol-formaldehyde adhesives, resorcinolformaldehyde adhesives, epoxy resin adhesives, polyisocyanate adhesives, and the like. Typical of the suitable thermoplastic resin adhesives are the polyvinyl adhesives, the acrylic resin adhesives, the polyamide resins, and the like. Also suitable are the two polymer adhesives, such as polyvinyl acetal/phenol resin adhesives, nitrile rubber/phenolic resin adhesives, neoprene rubber/phenolic resin adhesives, epoxy/nylon adhesives, and the like.

In the adhesives field the term "phenol-formaldehyde resin" is used to designate a condensation product of formaldehyde and a monohydric phenol including especially phenol itself, in addition to cresols and xylenols. Phenolformaldehyde adhesives may be prepared as disclosed in "Adhesion and Adhesives," by N. A. Bebruyne and R. Houwink, Elsevier Publishing Company, New York, 1951.

Suitable phenol-formaldehyde adhesives are disclosed in U.S. Pats. 2,437,981, 2,727,869, 2,878,197, and 2,988,536, which are hereby incorporated by reference.

Suitable resorcinol-formaldehyde adhesives are disclosed in U.S. Pats. 2,385,373, 2,385,374, and 2,478,943, which are hereby incorporated by reference.

The epoxy resin adhesives are characterized by the group:

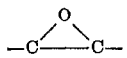

There are two general methods of producing epoxy resins, the first of which includes the addition of a substance already containing an epoxide group, such as epichlorohydrin (or other epihalohydrin) reacting with a substance having replaceable hydrogen atoms, and the second method includes reacting peracetic acid (or other appropriate oxygen-donating compound) with an olefin compound. The product of the first method is a glycidyl compound, which includes glycidyl ethers, amines and esters, the glycidyl ethers including the bis-phenol A epoxy resins, which are the type usually referred to generally as the epoxy resins. Epoxy adhesives include a liquid or a fusible solid containing epoxide group and a curing agent. The liquid containing epoxide group is mixed with the curing agent immediately before use, and curing begins when the resin and hardener are brought into intimate contact. The bis-phenol A epoxy adhesives adhere to most substances and are the most important of all high strength adhesives. The bis-phenol A epoxy adhesives are described and processes for producing them are disclosed in U.S. Pats. 2,500,600, 2,582,985, 2,615,007, and 2,615,008, which are hereby incorporated by reference.

Glycidyl compounds are generally prepared by reacting epichlorohydrin with a substance having a molecular structure which has replaceable hydrogen atoms such as hydroxyl groups. A glycidyl ether

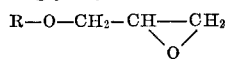

is obtained, the glycidyl compounds of bis-phenol A being the most important example of compound obtained by this reaction. The molecular structure of such a compound is commonly represented thusly:

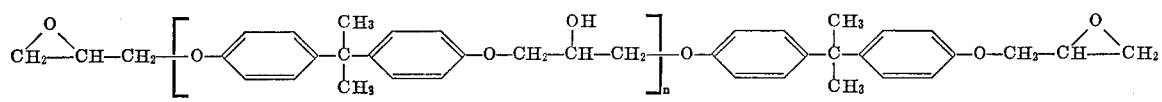

The general procedure for producing an epoxy resin is the following: bis-phenol A (2,2-(4,4'-dihydroxydiphenyl)propane) is heated with epichlorohydrin and aqueous sodium hydroxide at a temperature somewhat below the boiling point of aqueous sodium hydroxide. The epoxide group of epichlorohydrin and the hydroxyl group of bis-phenol A react with the resulting formation of a chlorohydrin. Hydrogen chloride is split off from the chlorohydrin and forms sodium chloride and water by reaction with sodium hydroxide. A new epoxy ring is formed as part of the glycidyl ether group.

U.S. Pat. 2,500,600 discloses a suitable epoxy resin composition comprising an epoxy ether having a 1,2-epoxy equivalency greater than one which is devoid of other reactive substituents than alcoholic hydroxyl groups, and 5°/o to 300°/o of the equivalent amount of a saturated aliphatic diamine of the formula $C_nH_{2n}(NH_2)_2$ wherein $n$ is an integer of at least 4 containing two primary amino groups, one of which is directly linked to a tertiary carbon atom.

Bis-phenol A epoxy adhesives are only useful when cured. The curing process results in cross-linking of the epoxy resins. The substances which will react with bis-phenol A resins to cure the epoxy resins are numerous and consist primarily of compounds containing active hydrogen atoms. In adhesive applications the most valuable hardners are polyamines and to some extent polycarboxylic acid and hydrides and phenolic resins. Typical of the suitable polyamine class are both aromatic and aliphatic polyamines. The most important polyamines are the homologous alkylene polyamines especially diethylenetriamine and triethylenetetramine. Other suitable amines include N,N-bis-(hydroxy ethyl)diethylenetriamine, N,N-tetramethylethylenediamine, N,N-dimethyl-aminopropylamine, and N,N-diethylaminopropylamine, metaphenylenediamine, 4,4'-diaminodiphenylmethane, 4,4'-diaminodiphenyl sulphone, diaminodiphenylmethane, diaminodiphenyl sulphone, pyromellitic dianhydride, phthalic anhydride, dodecenylsuccinic anhydride, methylenedomethyl-tetrahydrophthalic anhydride, and the like.

Suitable polyisocyanate adhesives are disclosed in U.S. Pats. 2,356,005, 2,597,025, and 2,650,212, which are hereby incorporated by reference.

Polyester resin based adhesives are also useful, especially those which utilize a peroxide curing agent.

The five most important chemical classes of thermoplastic adhesives are the cellulosic plastics, the vinyl polymers (including polystyrene), the acrylic polymers, the synthetic rubbers, and the polyamines. Frequently, a single adhesive composition will contain a mixture of several of these components. The cellulosic adhesives are not generally used in joining metals to other materials.

The polyvinyl adhesives are widely used in joining metals to other materials. Suitable polyvinyl adhesives include polyvinyl esters such as polyvinyl acetate, the polyvinyl acetals, polyvinyl alcohol, and polystyrene. The most important polyvinyl ester adhesive is polyvinyl acetate.

Suitable polyvinyl acetal adhesives are disclosed in U.S. Pats. 2,036,092, 2,116,635, and 2,496,480, which are hereby incorporated by reference.

Polyvinyl alcohol is not widely used in gluing smoothly finished metals although it is used in gluing coarse materials such as leather, cloth and paper. Due to the porous nature of the surface of foamed aluminum, polyvinyl alcohol may be successfully used in gluing porous materials to foamed aluminum.

Styrene is a vinyl monomer usually made by catalytic dehydrogenation of ethyl benzene. As an adhesive its polymers or copolymers are used in solution or as an aqueous dispersion. Polystyrene does not adhere very well to metals with a smooth finish, but will adhere to foamed aluminum due to the porous nature of the surface of foamed aluminum.

More valuable as adhesives are the copolymers of styrene and butadiene. These copolymers are useful adhesives, especially in the form of aqueous dispersions containing about 50°/o copolymer. A monomer ratio of about 50:50 may be used. If the ratio of styrene to butadiene is of the order of 60:40 and higher, the copolymer is non-tacky.

Typical of the acrylic resin adhesives which may be used are acrylic acid, methacrylic acid, methyl acrylate, ethyl acrylate, isobutyl acrylate, methyl methacrylate, ethyl methacrylate, and the like. Additional adhesion takes place largely through the tackiness of the dissolved polymer, but if a catalyst such as an organic peroxide is added the monomer subsequently polymerizes. Typical of the formulations of the acrylics which may be used as adhesives are those disclosed in U.S. Pats. 2,859,200, 2,916,469, and 2,962,471, which are hereby incorporated by reference.

Other suitable acrylic resin adhesives include the alkyl cyanoacrylate adhesives, acrylonitrile, acrylamide, and the acrylic copolymers. Suitable alkyl cyanoacrylate adhesives include ethyl 2-cyanoacrylate, methyl 2-cyano acrylate, and the like. Suitable formulations of the alkyl cyanoacrylates suitable for use as adhesives are disclosed in U.S. Pats. 2,763,585, 2,776,232, and 2,794,788, which are hereby incorporated by reference.

The most important acrylic copolymers are those from acrylonitrile. The acrylonitrile/butadiene copolymer has its widest use in the form of a latex. The monomer ratio in acrylonitriles/butadiene copolymer adhesives is generally selected to give a flexible material. This requires the butadiene to be in excess of the acrylonitrile, and a preferred range is for the butadiene to comprise up to at least 65% by weight.

Polyamide resins vary from medium viscosity liquid to hard thermoplastic solids with molecular weights suitably from about 3,000 to 9,000 and have melting points between 95° C. and 190° C. A polyamide resin composition suitable for use in adhesive is disclosed in U.S. Pat. 2,450,940, which is hereby incorporated by reference.

The types of nylon in common use as fibers are made from a straight-chain diamine and a straight-chain dicarboxylic acid. Used by themselves as adhesives, the nylons are capable of giving fair adhesion to metal and a variety of other materials, including wood.

When preparing a sandwich panel using the adhesive technique an adequate amount of adhesive should be applied over the entire outer layer surface. This is to ensure fullest contact between the adhesive and the outer layer and between the adhesive and the core. Where the foam portion core has no metal skin thereon, better results are obtained when sufficient adhesive is used (1) to fill substantially all the cavities on the core surface, and (2) to provide a thin layer of adhesive over substantially the entire bonding surface. In addition, sufficient pressure is ordinarily applied to the panel sandwich while the adhesive is curing or hardening; and this is to ensure uniform and adequate contact between the adhesive and the surfaces being bonded. The adhesive may be applied to the outer layer sheet surface alone, to the core surface alone, or to both surfaces. Furthermore, the sheet surface may be treated or prepared for applying the adhesive using adhesive art recognized techniques such as acid etching. Parkerizing, metal grit blasting, Bonderizing, sanding, and the like. In the case of metal sheet, the sheets are ordinarily degreased before the adhesive is applied.

As pointed out above, outer layers may also be applied to the present foamed metal core as fluid materials (liquids, pastes, gums, gels and the like) which will harden to a solid outer layer. These materials may simply be substances which are heated to make them fluid and which solidify on cooling. Examples of such materials are acrylonitrile/butadiene/styrene resins, polystyrene, glass, polyethylene and the like. Another example of a suitable material is polyvinylchloride plastisol which is fused by heating after application to the core. Most preferred materials are organic polymers and elastomers which can be chemically and/or thermally cured to form tough, impervious surfaces. Examples of useful polymers and elastomers are the polyester resins, the epoxy resins, the phenolic resins, the urea formaldehyde resins, polyurethane resins, ethylene/propylene/diene terpolymers, diene elastomers, Hypalon, polysulfides, natural rubber and other similar substances. These organic polymers and elastomers may also be used in conjunction with reinforcing material such as fiberglass, flocked fibers, asbestos, powdered metal, wood flour carbon black and the like.

Various foamed metals may be used as the foam metal portion of the core in the present panel construction. Examples of useful metals are lead, tin, copper, zinc tantalum, titanium, alloys of these metals such as steel, brass, and the like.

A preferred foamed metal is foamed aluminum. By aluminum is meant substantially pure aluminum as well as aluminum alloys containing 80% or more and preferably 90% or more aluminum. The following aluminum alloys are examples of useful alloys for preparing foam cores:

Alcoa alloy:

7075 (1.6% Cu, 2.5% Mg, 0.3% Cr, 5.6% Zn, remainder Al)
2024 (4.5% Cu, 0.6% Mn, 1.5% Mg, remainder Al)
5086 (0.45% Mn, 4.0% Mg, 0.1% Cr, remainder Al)
6063 (0.4% Si, 0.7% Mg, remainder Al)
Almag 35 (6–8% Mg in Al)
1000 series Al (99.6% minimum Al)
2011 (5.5% Cu, 0.5% Pb, 0.5% Bi, remainder Al)
2218 (4.0% Cu, 1.5% Mg, 2% Ni, remainder Al)
3005 (1.2% Mg, 0.4% Mg, remainder Al)
4042 (12.2% Si, 0.9% Cu, 1.1% Mg, 0.9% Ni, remainder Al)
4043 (5% Si, 95% Al)
8280 (1.5% Si, 1.0% Cu, 0.5% Ni, remainder Al)
Magnalium—70% Al, 30% Mg The foamed metals used in the present construction may be prepared by processes known in the art. In general, such processes involve blowing molten metal with a suitable gas generating agent such as lithium hydride, titanium hydride, zirconium hydride and the like. Air properly entrained in a molten metal may also be used in preparing such foam. Where a blowing agent such as a metal hydride is used, a viscosity control additive may be used in the molten metal during the foaming process to help control the foam density pore uniformity. Representative examples of suitable processes for preparing foamed metal are found in U.S. 3,297,431, U.S. 3,300,296, and U.S. 3,305,902.

As pointed out above, foamed aluminum is a most preferred core material. The density of the foamed aluminum may vary over a wide range. Generally, foamed aluminum having a density of less than about 50 p.c.f. can be used. Foams ranging from 5 to 35 p.c.f. are preferred; densities ranging below about 27 p.c.f. are more preferred; and a foam density anging from about 8 to about 27 p.c.f. is most preferred.

The present construction features the use of reinforcing elements in the foamed metal core structure. The reinforcing elements, as the figures illustrate, are substantially within and are bonded to the foamed meta portion of the core as well as to the outer layer or layers of the sandwich panel. Bonding of these reinforcing elements to the foamed metal is conveniently achieved using a suitable adhesive system of the type already described above; and a thermoset adhesive is preferred.

The reinforcing elements may be of any material, preferably of the type described as useful for the outer layers of the present construction. The reinforcing elements can be of the same material as the outer layer, or they may be of a different material. Metal reinforcing elements are more preferred.

The size and shape of the reinforcing elements can be varied. Thus, in addition to the shape illustrated in the drawings, the elements can be hemispherical, spherical, corrugated, peforated, pyrimidal or any combination of these shapes. As the figures illustrate, however, whatever the shape, the reinforcing elements constitute only a small fraction of the total volume of the whole core section. The number and spacing of the reinforcing elements in the construction can also be varied depending on the ultimate strength required for the finished sandwich panel construction. As pointed out above, an important requirement for the reinforcing elements is that they extend substantially fully through the foam and to the outer layer or layers of the sandwich panel; and preferably that these elements (where the shape of the elements permits) be perpendicular to said outer layer or layers. The figures also show the reinforcing elements to be spaced equidistant within the core. This is meant only to be illustrative and not limiting. In other words, the distance between the reinforcing elements can be varied as desired. Although the perpendicular reinforcing element placement is preferred, non-perpendicular reinforcing elements as well as combinations of non-perpendicular and perpendicular elements can be utilized.

Figure 4:
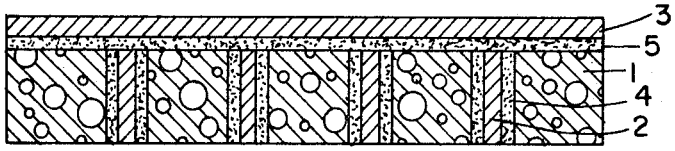
Figure 5:
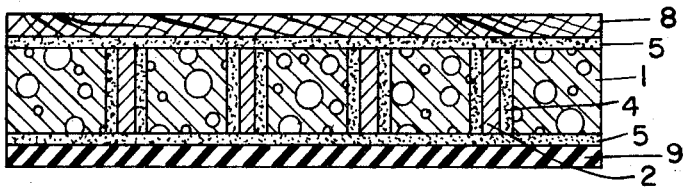
Figure 6:
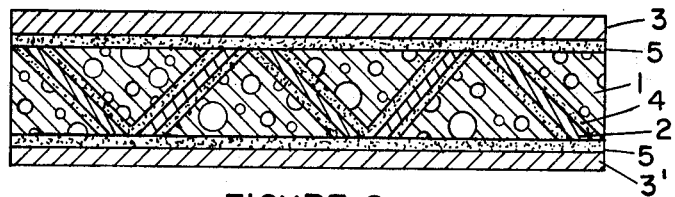
Figure 7:
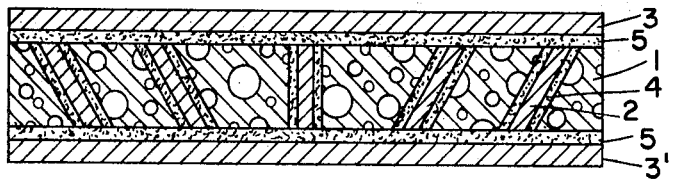
Figure 8:
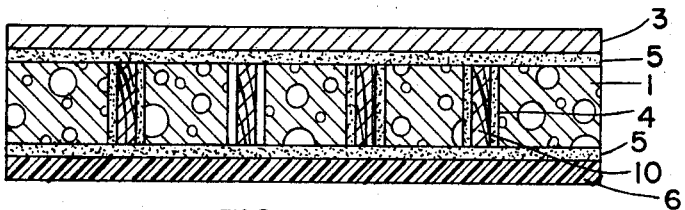
Figure 9:
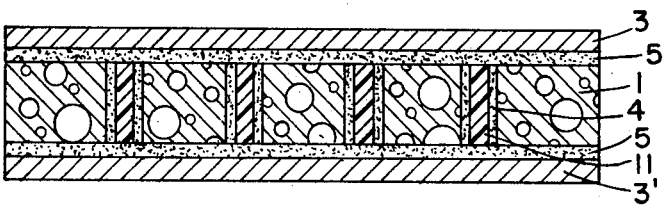

The present reinforced sandwich panel construction can be prepared by a number of different methods. One method is to secure the reinforcing elements in the particular pattern desired onto one outer layer of the finished panel construction. The inside face of this panel and the reinforcing elements then are coated with a suitable adhesive system, such as an amine cured epoxy, or a peroxide cured polyester. The metal prefoam metal can then be cast or extruded as a fluid into this assembly and allowed to foam. After the foam has solidified, a reinforced panel construction having one outer layer (see, e.g., FIG. 4) is obtained. A similar technique can be used for preparing other reinforced panel constructions.

Figure 10:
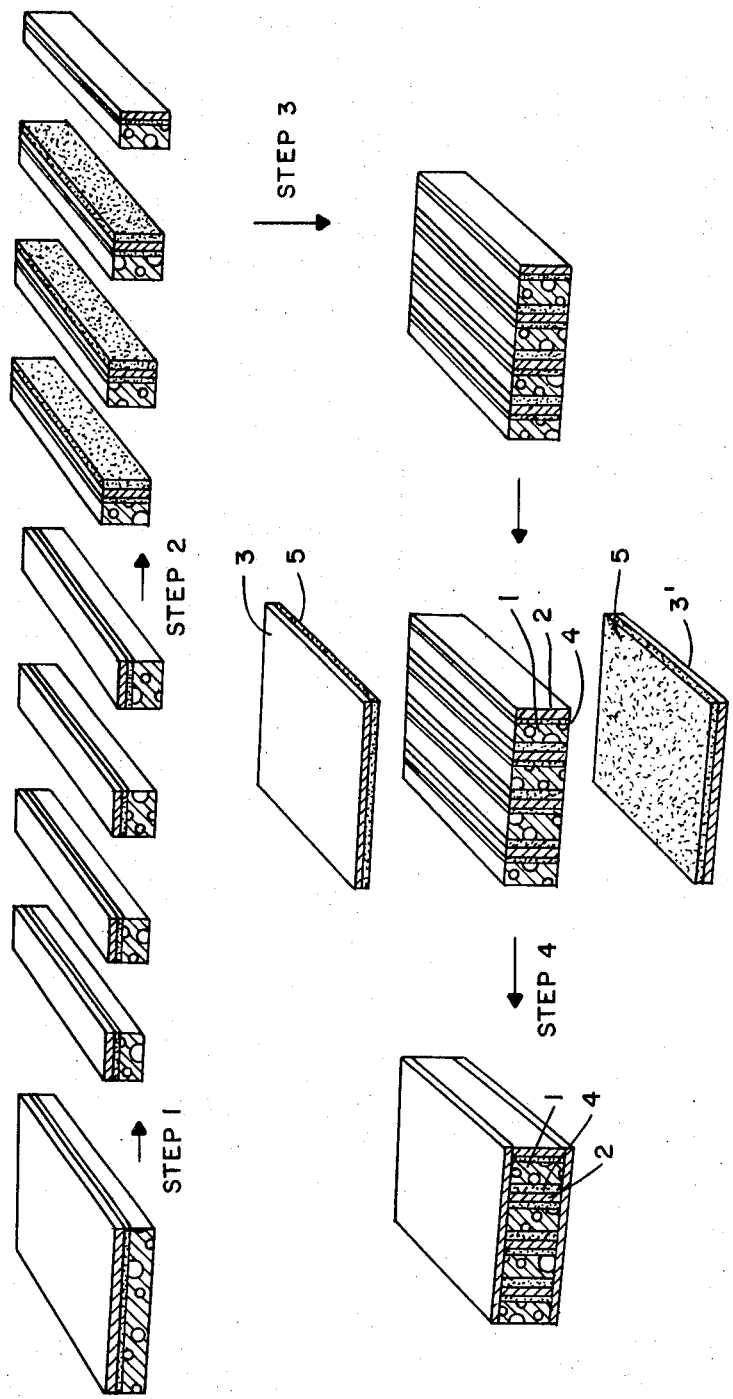
FIG. 10 is a schematic illustration of a method of preparing said sandwich construction. The same numbers are used to designate the same elements in each figure.

Another useful method for preparing panels of the present invention involves laminating individual pieces of foamed metal coated with a suitable material to provide a reinforced core structure as illustrated in the figures; and then to attach outer layers to said laminate to complete the panel construction. This particular method is advantageous since it is a relatively simple procedure; it does not require sophisticated manufacturing equipment; and it provides for flexibility in controlling the shape, size and placement of the reinforcing elements, as well as the size and shape of the completed final panel. FIG. 10 illustrates this method generally. In this schematic presentation, a slab of metal foam having one metal outer layer bonded to it, is sliced into sections (Step 1). An adhesive is then applied to the metal outer layer of each section (Step 2). The sections are then laminated adhesive side to uncoated foam side and held under pressure (heat is generally applied) until the adhesive sets, to form the reinforced core (Step 3). The core is then bonded to two ahesive coated outer layers to produce the finished reinforced panel (Step 4).

The schematic procedure of FIG. 10 is illustrative and is not meant to limit the scope of the method; and it can be used to prepare any of the reinforced panels of the present invention.

An outstanding feature of the reinforced core panel construction of the present invention is that it is substantially stronger and more resistant to deformation than a comparable construction wherein the foamed metal core is not reinforced. To demonstrate the superior strength of the present construction, sets of sandwich panels of equivalent sizes having reinforced foam core and unreinforced foam core were prepared. The reinforced foam core used in this set of panel constructions was prepared by laminating pieces cut from a foamed aluminum slab having sheet aluminum bonded to one side thereof (as described above and illustrated in FIG. 10). These two sets of panel constructions had sheet aluminum bonded to opposite sides of the respective cores. Aluminum sheets in each instance were bonded to the particular core with a commercial thermosetting adhesive system identified by the manufacturer as "Fuller FE 073–9." The reinforcing elements in the reinforced core panels were sheet aluminum alloy. The final finished thickness of the complete panel construction in each instance (both reinforced and unreinforced core) was about ¾"; and the foam metal in all the panels was 13 p.c.f. foam aluminum. Tabulation of the sets of panels, identifying the particular structures are set out below.

TABLE 1.—SANDWICH PANELS

| Example | Core [1] [2] [3] reinforcing elements | Outer layers [2] |
|---|---|---|
| 1 | None | 20 mil—7056–T–6. |
| 2 | 20 mil—7056–T–6 Al alloy | Aluminum alloy. |
| 3 | None | 32 mil—7178–T–6. |
| 4 | 32 mil—7178–T–6 Al alloy | Aluminum alloy. |
| 5 | None | 40 mil—6061–T–6. |
| 6 | 40 mil—6061–T–6 Al alloy | Aluminum alloy. |

[1] Foam in core was 13 p.c.f. aluminum foam.
[2] Fuller FE 073-9, a commercial thermosetting epoxy based adhesive was used throughout the construction.
[3] The reinforcing elements were spaced at one inch intervals beginning one inch from the panel edge, perpendicular to the outer layer (see Figure 1).

To demonstrate the improved strength of the present construction, the sets of sandwich panels of Table 1 were tested as follows:

A 2½" by 12" rectangular test piece was cut from the sandwich panel. Where the core was reinforced, the piece was cut so that the 2½" dimension was parallel to the reinforcing elements. The test piece was then set up on supports so that the supports were parallel to the 2½" dimension and approximately 1" from each test piece edge; thus, providing an unsupported span of about 10". The unsupported span was then incrementally and uniformly loaded across its midpoint by means of a 1" square bar, placed parallel to the 2½" dimension, driven by an Instron tester. Maximum load (load just prior to failure), percent deflection at maximum load and load at 2% deflection were all measured. The data obtained is presented in the following table; tests were run in duplicate. The percent deflection was calculated as follows:

$$\% \text{ Deflection} = \frac{\text{Deflection (in.)}}{\text{Length of unsupported span (in.)}} \times 100$$

TABLE 2.—STRENGTH AND DEFLECTION DATA

| Panel example | Reinforced core | Max. load (lbs.) | Max. deflection, percent | Load @ 2% def. |
|---|---|---|---|---|
| 1 | No | 760 | 1.7 | Failed |
| 1 | No | 760 | 1.7 | Failed |
| 2 | Yes | 1,800 | 3.3 | 1,300 |
| 2 | Yes | 1,760 | 2.95 | 1,300 |
| 3 | No | 940 | 1.70 | Failed |
| 3 | No | 710 | 1.40 | Failed |
| 4 | Yes | 3,420 | 4.0 | 2,200 |
| 4 | Yes | 3,420 | 4.4 | 2,100 |
| 5 | No | 1,350 | 1.50 | Failed |
| 5 | No | 1,350 | 1.75 | Failed |
| 6 | Yes | 2,600 | 6.40 | 2,250 |
| 6 | Yes | 2,550 | 5.70 | 2,250 |

The data in Table 2 clearly illustrates the improved strength of the present reinforced core panel construction. In each instance, the reinforced core construction has a substantially greater load carrying capacity than the analogous construction having an unreinforced core. Thus, the present reinforced metal foam core panel provides a construction having improved load carrying capacity and rigidity while maintaining all the good features such as, strength/weight ratio, resistance to deterioration caused by ordinary weathering and aging, fire resistance, of an unreinforced metal foam core panel.

Figure 3:
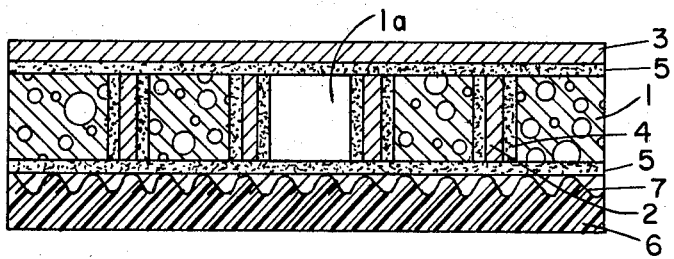

The present panel construction has myriad uses for example, as heavy duty flooring in trucks, commercial buildings, airplanes, boats and the like; in load bearing wall construction; in roof construction. The sandwich panel construction illustrated by FIG. 3 is especially useful in floor and wall construction since it provides an enclosed passageway (or passageways) for running electrical conduit, water lines, fuel lines, etc., or even bulk fluids, for example, water therethrough.

Claims to the invention described herein follow.

I claim:

1. Improved sandwich panel construction having two outer layers attached to opposite sides of a foamed metal core wherein said core has reinforcing elements encased in and bonded thereto, said elements running continuously through said core and being non-parallel to, and extending substantially fully between said outer layers.

2. The construction of claim 1 wherein said foamed metal is foamed aluminum.

3. The construction of claim 2 wherein said foamed aluminum has a density ranging from about 5 pounds per cubic foot to about 35 pounds per cubic foot.

4. The construction of claim 1 wherein said outer layers are of materials independently selected from wood, metal, glass, thermoplastic organic polymers, thermoset organic polymers, and elastomers.

5. The construction of claim 4 wherein said foamed metal is a foamed aluminum.

6. The construction of claim 5 wherein said outer layers are attached to said core with an adhesive.

7. The construction of claim 6 wherein said outer layers are discrete sheets.

8. The construction of claim 7 wherein one of said outer layers is aluminum and the other of said outer layers is steel.

9. The construction of claim 7 wherein both of said outer layers are aluminum.

10. The construction of claim 7 wherein one of said outer layers is metal sheet and the other outer layer is fiberglass reinforced thermoset organic polymer.

11. The construction of claim 1 wherein a passageway is provided in said foamed metal core, said passageway running continuously and parallel to said outer layers and said reinforcing elements.

12. The construction of claim 1 wherein said reinforcing elements are substantially perpendicular to said outer layers.

13. The construction of claim 12 wherein said foamed metal is a foamed aluminum.

14. The construction of claim 13 wherein said foamed aluminum has a density ranging from about 5 pounds per cubic foot to about 35 pounds per cubic foot.

15. The construction of claim 14 wherein said outer layers are discrete sheets independently selected from wood and metal.

16. The construction of claim 15 wherein said outer layers are bonded to said core with a thermoset adhesive.

17. The construction of claim 16 wherein said adhesive is fiberglass filled.

18. The construction of claim 15 wherein said reinforcing elements are metal and are bonded to said foamed metal with a thermoset adhesive.

19. The construction of claim 18 wherein said elements have a thickness equal to or less than that of said outer layers.

20. The construction of claim 19 wherein said outer layers and said reinforcing elements are 20–30 gauge metal sheet.

References Cited
UNITED STATES PATENTS 3,617,364   11/1971   Jarema et al. _____ 161—160

WILLIAM J. VAN BALEN, Primary Examiner

U.S. Cl. X.R.

161—40, 41, 55, 123, 165